US012644851B2

(12) United States Patent (10) Patent No.: US 12,644,851 B2
Porat et al. (45) Date of Patent: Jun. 2, 2026

(54) METHOD AND APPARATUS FOR INSPECTION OF PANEL EMBEDDED DIES USING COMBINED THERMAL AND OPTICAL IMAGING

(71) Applicant: Orbotech Ltd., Yavne (IL)

(72) Inventors: Elkana Porat, Yavne (IL); Ronen Yogev, Hulda (IL); Nava Shpaisman, Yavne (IL)

(73) Assignee: Orbotech Ltd., Yavne (IL)

( * ) Notice: Subject to any disclaimer, the term of this patent is extended or adjusted under 35 U.S.C. 154(b) by 120 days.

(21) Appl. No.: 18/618,475

(22) Filed: Mar. 27, 2024

(65) Prior Publication Data

US 2025/0146955 A1 May 8, 2025

Related U.S. Application Data

(60) Provisional application No. 63/547,147, filed on Nov. 3, 2023.

(51) Int. Cl.
*G01N 21/956* (2006.01)
*G01J 5/00* (2022.01)
(Continued)

(52) U.S. Cl.
CPC ............... *G01N 25/72* (2013.01); *G01J 5/48* (2013.01); *G01J 5/485* (2022.01); *G01N 21/171* (2013.01);
(Continued)

(58) Field of Classification Search
CPC ............... G01N 25/72; G01N 21/8806; G01N 21/8851; G01N 21/9505; G01N 21/95607;
(Continued)

(56) References Cited

U.S. PATENT DOCUMENTS 5,111,048 A 5/1992 Devitt et al.
6,269,179 B1 * 7/2001 Vachtsevanos ....... G06T 7/0004
348/126

(Continued)

FOREIGN PATENT DOCUMENTS

CN 107369740 A 11/2017
CN 107389732 B 8/2019
(Continued)

OTHER PUBLICATIONS

Thatcher et al., "Low cost infrared thermography for automated crack monitoring in fatigue testing," Optics and Lasers in Engineering, 2020, No. 105914.
(Continued)

*Primary Examiner* — Sang H Nguyen
(74) *Attorney, Agent, or Firm* — Hodgson Russ LLP

(57) ABSTRACT

The system includes a thermal subsystem, an optical subsystem, and a processor. The thermal subsystem comprises a first laser light source configured to emit laser light, a first focusing lens configured to direct the laser light onto a workpiece, and a thermal camera configured to capture a thermal image of the workpiece. The optical subsystem includes at least one light source configured to emit laser light with at least one illumination modality, at light focusing lens configured to direct the light onto the workpiece, and a detector configured to capture at least one image of the workpiece. The processor is configured to compare the at least one image received from the detector to at least one reference image for registration of the workpiece or to determine presence of a surface defect on the workpiece, and to determine presence of a bulk defect in the workpiece based on the thermal image.

18 Claims, 11 Drawing Sheets

(51) Int. Cl.

| | |
|---|---|
| *G01J 5/48* | (2022.01) |
| *G01N 21/17* | (2006.01) |
| *G01N 21/88* | (2006.01) |
| *G01N 21/95* | (2006.01) |
| *G01N 25/72* | (2006.01) |

(52) U.S. Cl.
CPC ..... *G01N 21/8806* (2013.01); *G01N 21/8851* (2013.01); *G01N 21/9505* (2013.01); *G01N 21/95607* (2013.01); *G01N 21/95684* (2013.01); *G01J 2005/0077* (2013.01); *G01N 2021/1714* (2013.01); *G01N 2021/8835* (2013.01); *G01N 2021/8864* (2013.01); *G01N 2021/95638* (2013.01); *G01N 2201/1042* (2013.01)

(58) Field of Classification Search
CPC ..... G01N 21/95684; G01N 2021/1714; G01N 2021/8835; G01N 2021/8864; G01N 2021/95638; G01N 2201/1042; G01J 5/48; G01J 5/485; G01J 2005/0077
See application file for complete search history.

(56) References Cited

U.S. PATENT DOCUMENTS

| | | | |
|---|---|---|---|
| 6,730,912 | B2 | 5/2004 | Sun et al. |
| 8,428,337 | B2 | 4/2013 | Chan |
| 9,157,869 | B2 | 10/2015 | Ortner et al. |
| 9,500,599 | B2 | 11/2016 | Mun et al. |
| 9,976,968 | B2 | 5/2018 | Ito et al. |
| 10,119,921 | B2 | 11/2018 | Takeda et al. |
| 10,324,044 | B2 | 6/2019 | Marivoet et al. |
| 10,444,173 | B2 | 10/2019 | Maione et al. |
| 2003/0174877 | A1 | 9/2003 | Aiger |
| 2004/0028113 | A1 | 2/2004 | Schlagheck et al. |
| 2009/0196489 | A1 | 8/2009 | Le |
| 2010/0074515 | A1 | 3/2010 | Zhao et al. |
| 2018/0159469 | A1* | 6/2018 | Trupke ................... H02S 50/15 |
| 2019/0114755 | A1 | 4/2019 | Lee et al. |
| 2019/0139901 | A1* | 5/2019 | Scanlan ............... H01L 21/565 |
| 2019/0170591 | A1* | 6/2019 | Petry ........................ G01J 5/00 |
| 2019/0228523 | A1 | 7/2019 | Chu |
| 2020/0175669 | A1* | 6/2020 | Bian ..................... G06T 7/0004 |
| 2020/0225278 | A1 | 7/2020 | Seeger |
| 2021/0018314 | A1* | 1/2021 | Hong ................. G01B 11/0675 |
| 2021/0101332 | A1* | 4/2021 | Kawanaka ........... B29C 64/393 |
| 2021/0197287 | A1* | 7/2021 | Sohn ...................... B22F 10/36 |
| 2022/0214286 | A1* | 7/2022 | Yacoubian ......... G01N 21/9515 |

FOREIGN PATENT DOCUMENTS

| | | |
|---|---|---|
| CN | 113203743 A | 8/2021 |
| CN | 115950896 A | 4/2023 |
| EP | 3100032 B1 | 10/2018 |

OTHER PUBLICATIONS

Tang et al., "Theoretical Study on Infrared Thermal Wave Imaging Detection of Semiconductor Silicon Wafers With Micro-Crack Defects," Thermal Science, 2020, vol. 24, No. 6B.

Puthiyaveettil et al., "Laser line scanning thermography for surface breaking crack detection: modeling and experimental study," Infrared Physics & Technology, 2020, vol. 104.

Li et al., "Crack imaging by scanning laser-line thermography and laser-spot thermography," Measurement Science and Technology, 2011, vol. 22. No. 3.

Yang et al., "Infrared Thermal Imaging-Based Crack Detection Using Deep Learning," IEEE Access, 2019.

Yang et al., "Multi-spot Laser Lock-in Thermography for Real-time Imaging of Cracks in Semiconductor Chips during a Manufacturing Process," Journal of Materials Processing Technology, 2015.

Infratec, "FLIR: Forward Looking InfraRed—FLIR Cameras from InfraTec for Thermal Imaging," retrieved from the internet: <https://www.infratec.eu/thermography/flir-forward-looking-infrared-cameras-from-infratec/>, 2024.

Pech-May et al., "Fast Characterization of the Width of Vertical Cracks Using Pulsed Laser Spot Infrared Thermography," J. Nondestruct. Eval., 2016, vol. 35, No. 22.

WIPO, International Search Report issued in International Application No. PCT/IB2024/060800, Jan. 27, 2025.

* cited by examiner

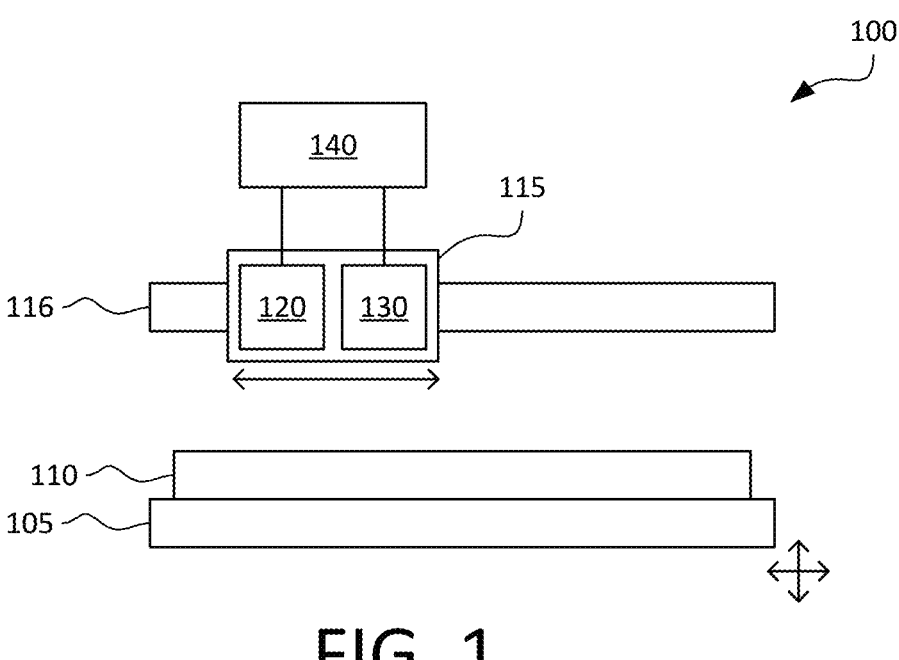
FIG. 1
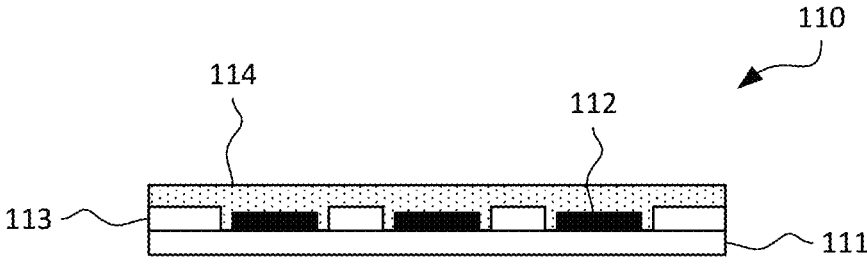
FIG. 2A
FIG. 2B

240

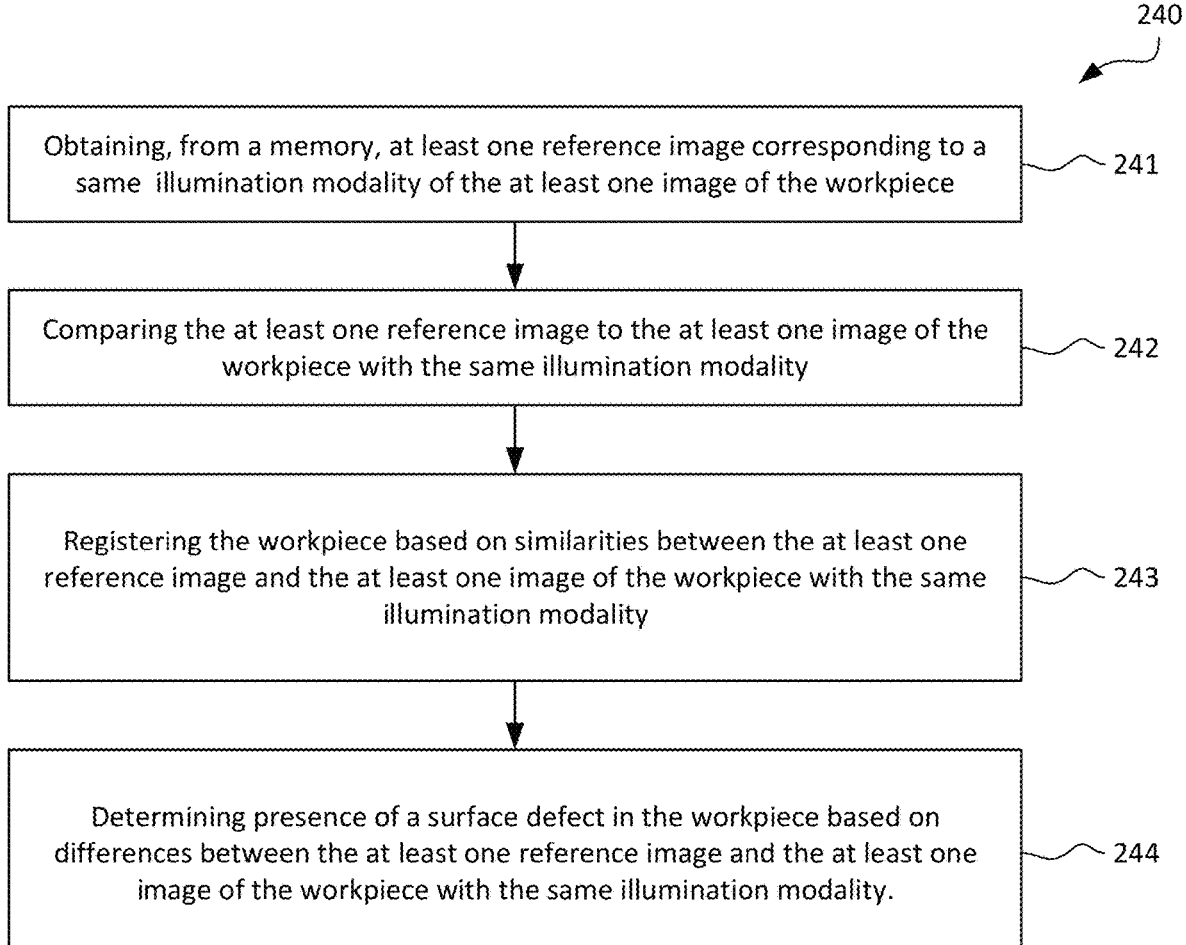

Obtaining, from a memory, at least one reference image corresponding to a same illumination modality of the at least one image of the workpiece    241

Comparing the at least one reference image to the at least one image of the workpiece with the same illumination modality    242

Registering the workpiece based on similarities between the at least one reference image and the at least one image of the workpiece with the same illumination modality    243

Determining presence of a surface defect in the workpiece based on differences between the at least one reference image and the at least one image of the workpiece with the same illumination modality.    244

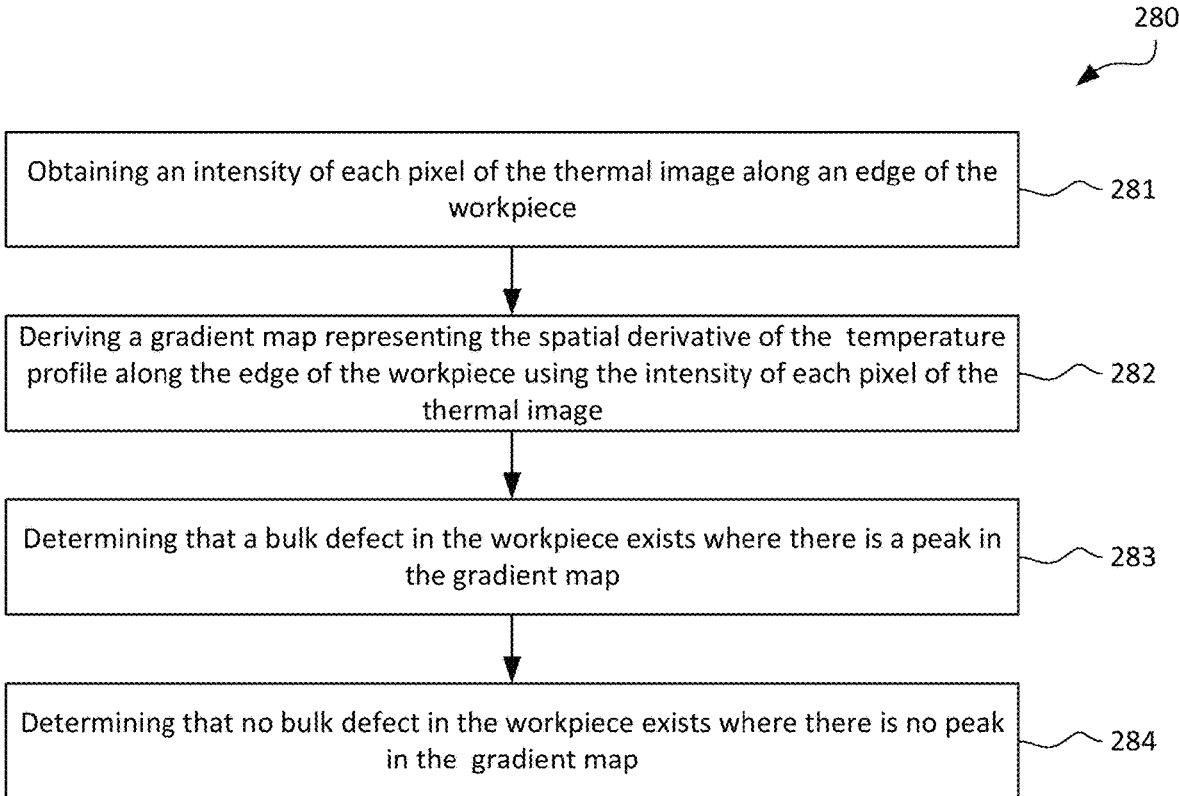

Obtaining an intensity of each pixel of the thermal image along an edge of the workpiece — 281

Deriving a gradient map representing the spatial derivative of the temperature profile along the edge of the workpiece using the intensity of each pixel of the thermal image — 282

Determining that a bulk defect in the workpiece exists where there is a peak in the gradient map — 283

Determining that no bulk defect in the workpiece exists where there is no peak in the gradient map — 284

Moving a stage in a first direction, wherein the workpiece is disposed on the stage ~ 255

Moving a carrier in a second direction, wherein the at least one light source, the detector, the first laser light source, and the thermal camera are disposed on the stage, and the second direction is orthogonal to the first direction ~ 256

B

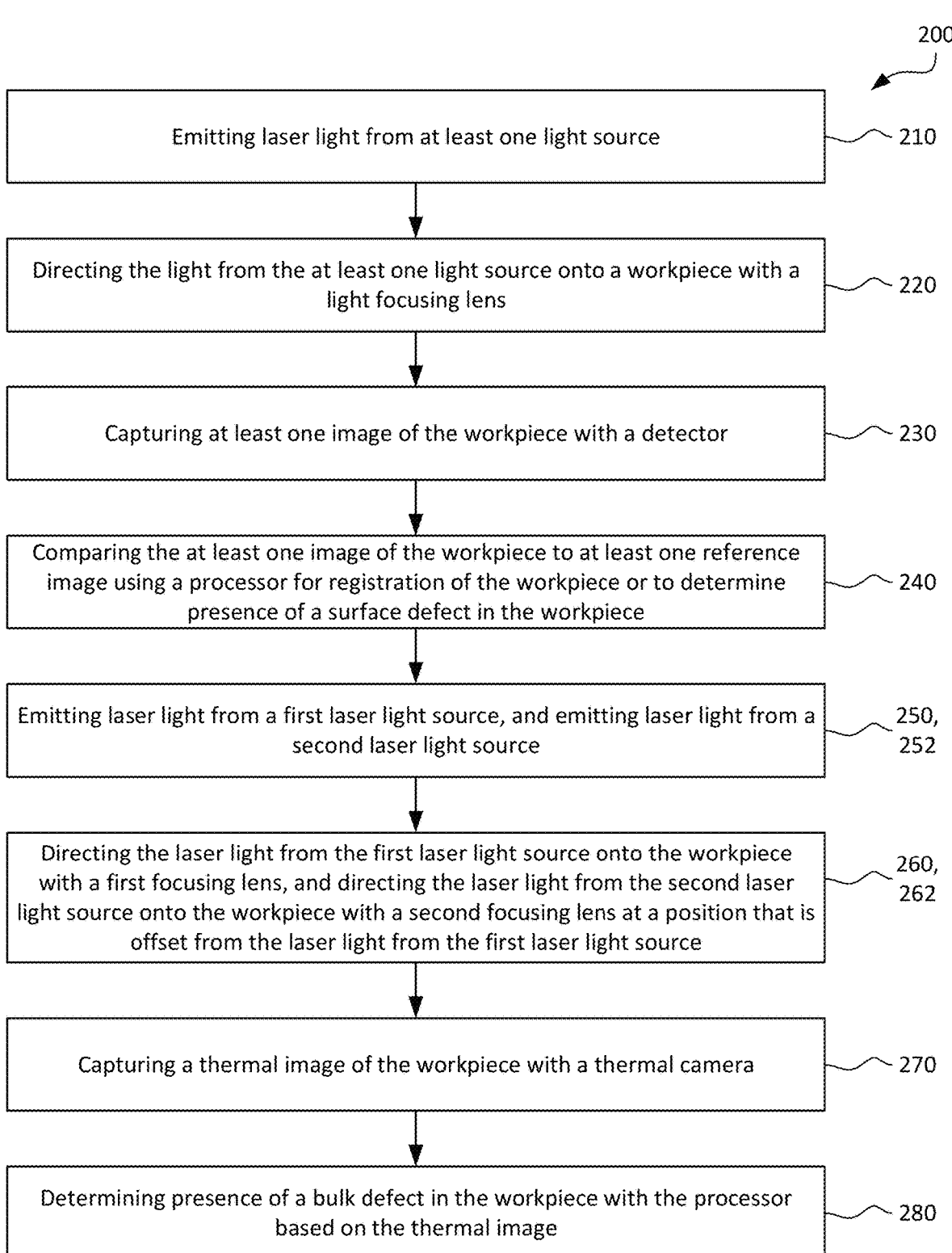

200

Emitting laser light from at least one light source — 210

Directing the light from the at least one light source onto a workpiece with a light focusing lens — 220

Capturing at least one image of the workpiece with a detector — 230

Comparing the at least one image of the workpiece to at least one reference image using a processor for registration of the workpiece or to determine presence of a surface defect in the workpiece — 240

Emitting laser light from a first laser light source, and emitting laser light from a second laser light source — 250, 252

Directing the laser light from the first laser light source onto the workpiece with a first focusing lens, and directing the laser light from the second laser light source onto the workpiece with a second focusing lens at a position that is offset from the laser light from the first laser light source — 260, 262

Capturing a thermal image of the workpiece with a thermal camera — 270

Determining presence of a bulk defect in the workpiece with the processor based on the thermal image — 280

FIG. 12

METHOD AND APPARATUS FOR INSPECTION OF PANEL EMBEDDED DIES USING COMBINED THERMAL AND OPTICAL IMAGING

CROSS-REFERENCE TO RELATED APPLICATIONS

This application claims priority to the provisional patent application filed Nov. 3, 2023, and assigned U.S. App. No. 63/547,147, the disclosure of which is hereby incorporated by reference.

FIELD OF THE DISCLOSURE

This disclosure relates to semiconductor manufacturing and, more particularly, to inspection processes for detection of defects in semiconductor manufacturing and assembly.

BACKGROUND OF THE DISCLOSURE

Evolution of the electronics manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it maximizes the return-on-investment for an electronics manufacturer.

Fabricating semiconductor devices, such as logic and memory devices, typically includes processing a semiconductor wafer using a large number of fabrication processes to form various features and multiple levels of the semiconductor devices. An arrangement of multiple semiconductor devices fabricated on a single semiconductor wafer may be diced into individual semiconductor devices or dies. After dicing, the singulated dies may be packed with a secondary substrate, for example an integrated circuit (IC) substrate or a printed circuit board (PCB).

As part of the packaging process, various processes are performed, such as dicing, die placement, encapsulation, overcoating, molding, and others. During these processes, structural defects (e.g., cracks, chipping, delamination, or others) may occur in the semiconductor device or its encapsulation materials (e.g., ABF). These defects may cause a functional failure of the device or increase the risk for future failure during the device life-cycle.

Inspection processes are used at various steps during electronics manufacturing to detect defects on wafers, electronic devices, or electrical circuits to promote higher yield in the manufacturing process and, thus, higher profits. Inspection has always been an important part of fabricating electronic devices such as integrated circuits (ICs) and printed circuit boards (PCBs), including assembled PCBs. However, as emerging markets (e.g., electric vehicles and others) push for increased reliability requirements, detection of structural defects of packaged semiconductor device of decreasing size has become necessary, because even relatively small defects may cause unwanted failure of the devices during its complete life-cycle.

The fabrication of panels with embedded IC dies includes several process steps that may introduce a mechanical stress onto the dies. Such process steps may include, for example, the mounting and positioning process of the die onto the panel or subsequent steps of lamination. In some cases, these stresses can lead to the formation of microcracks in the dies. Since these cracks are typically of submicron to several micron width, detection using traditional optical inspection can be challenging. Furthermore, even if the optical system has the resolution to identify the cracks, it only provides 2D data and cannot distinguish deep, detrimental cracks from surface scratches that have no functional significance. Lastly, optical imaging is altogether impossible after the dies are coated with an additional layer that may be opaque or optically scattering (e.g. ABF).

Therefore, what is needed is a method capable of detecting defects in embedded semiconductor dies.

BRIEF SUMMARY OF THE DISCLOSURE

An embodiment of the present disclosure provides a system comprising a thermal subsystem, an optical subsystem, and a processor in electronic communication with the thermal subsystem and the optical subsystem. The thermal subsystem may comprise a first laser light source configured to emit laser light; a first focusing lens configured to direct the laser light from the first laser light source onto a workpiece; and a thermal camera configured to capture a thermal image of the workpiece. The optical subsystem may comprise at least one light source configured to emit light with at least one illumination modality; a light focusing lens configured to direct the light from the at least one light source onto the workpiece; and a detector configured to capture at least one image of the workpiece. The processor may be configured to compare the at least one image received from the detector to at least one reference image to for registration of the workpiece or to determine presence of a surface defect on the workpiece; and determine presence of a bulk defect in the workpiece based on the thermal image.

In some embodiments, the workpiece is a PCB panel with at least one embedded semiconductor die. The PCB panel may further include a dielectric overcoat layer deposited over the at least one embedded semiconductor die.

In some embodiments, the system may further comprise a first scanning mirror configured to direct the laser light from the first laser light source to scan around the perimeter of the workpiece.

In some embodiments, the system may further comprise a stage and a carrier. The workpiece may be disposed on the stage, and the stage may be movable relative to the thermal subsystem in a first direction. The thermal subsystem and the optical subsystem may be disposed on the carrier, and the carrier may be movable relative to the stage in a second direction that is orthogonal to the first direction.

In some embodiments, the thermal subsystem may further comprise a second laser light source configured to emit laser light; and a second focusing lens configured to direct the laser light from the second laser light source onto the workpiece at a position that is offset from the laser light from the first laser light source.

In some embodiments, the thermal camera may be a forward looking infrared (FLIR) camera.

In some embodiments, the processor is configured to determine presence of a bulk defect in the workpiece based on the thermal image by: obtaining an intensity of each pixel of the thermal image along an edge of the workpiece; deriving a gradient map representing a spatial derivative of a temperature profile along the edge of the workpiece using the intensity of each pixel of the thermal image; determining that a bulk defect in the workpiece exists where there is a peak in the gradient map; and determining that no bulk defect exists in the workpiece a where there is no peak in the gradient map.

In some embodiments, the at least one illumination modality comprises a plurality of illumination modalities. The at least one light source may be configured to emit light according to each of the plurality of illumination modalities. The detector may be configured to capture a plurality of images of the workpiece t corresponding to the plurality of illumination modalities.

In some embodiments, the processor may be configured to register the workpiece based on similarities between the at least one reference image and the at least one image of the workpiece with the same illumination modality.

In some embodiments, the processor may be configured to determine presence of a surface defect in the workpiece based on differences between at the at least one reference image and the at least one image of the workpiece with the same illumination modality.

Another embodiment of the present disclosure provides a method comprising: emitting light from at least one light source with at least one illumination modality; directing the light from the at least one light source onto a workpiece with a first focusing lens; capturing at least one image of the workpiece with a detector; comparing, with a processor, the at least one image of the workpiece to at least one reference image for registration of the workpiece or to determine presence of a surface defect on the workpiece; emitting laser light from a first laser light source; directing the laser light from the first laser light source onto the workpiece at the location of the defect with a first focusing lens; capturing a thermal image of the workpiece with a thermal camera; and determining, with the processor, presence of a bulk defect in the workpiece based on the thermal image.

In some embodiments, the method may further comprise scanning the laser light from the first laser light source around the perimeter of the workpiece with a first scanning mirror.

In some embodiments, the method may further comprise moving a stage in a first direction; and moving a carrier relative to the stage in a second direction. The second direction may be orthogonal to the first direction. The workpiece may be disposed on the stage, and the at least one light source, the detector, the first laser light source, and the thermal camera may be disposed on the carrier.

In some embodiments, the method may further comprise emitting laser light from a second laser light source; and directing the laser light from the second laser light source onto the workpiece with a second focusing lens at a position that is offset from the laser light from the first laser light source.

In some embodiments, determining, with the processor, presence of a bulk defect in the workpiece comprises: obtaining an intensity of each pixel of the thermal image along an edge of the workpiece; deriving a gradient map representing a spatial derivative of a temperature profile along the edge of the workpiece based on the intensity of each pixel of the thermal image; determining that a bulk defect in the workpiece exists where there is a peak in the gradient map; and determining that no bulk defect exists in the workpiece where there is no peak in the gradient map.

In some embodiments, comparing, with the processor, the at least one image of the workpiece to at least one reference image for registration of the workpiece or to determine presence of a surface defect in the workpiece comprises: obtaining, from a memory, at least one reference image corresponding to the illumination modality of the at least one image of the workpiece; comparing the at least one reference image to the at least one image of the workpiece with the same illumination modality; and registering the workpiece based on similarities between the least one reference image and the at least one image of the workpiece with the same illumination modality.

In some embodiments, comparing, with the processor, the at least one image of the workpiece to at least one reference image for registration of the workpiece or to determine presence of a surface defect on the workpiece further comprises determining presence of a surface defect on the workpiece based on differences between the least one reference image and the at least one image of the workpiece with the same illumination modality.

DESCRIPTION OF THE DRAWINGS

For a fuller understanding of the nature and objects of the disclosure, reference should be made to the following detailed description taken in conjunction with the accompanying drawings, in which:

FIG. 1 is a side view of a system according to an embodiment of the present disclosure;

FIG. 2A is a cross-sectional view of an exemplary workpiece of an embodiment of the present disclosure;

Figure 3A:
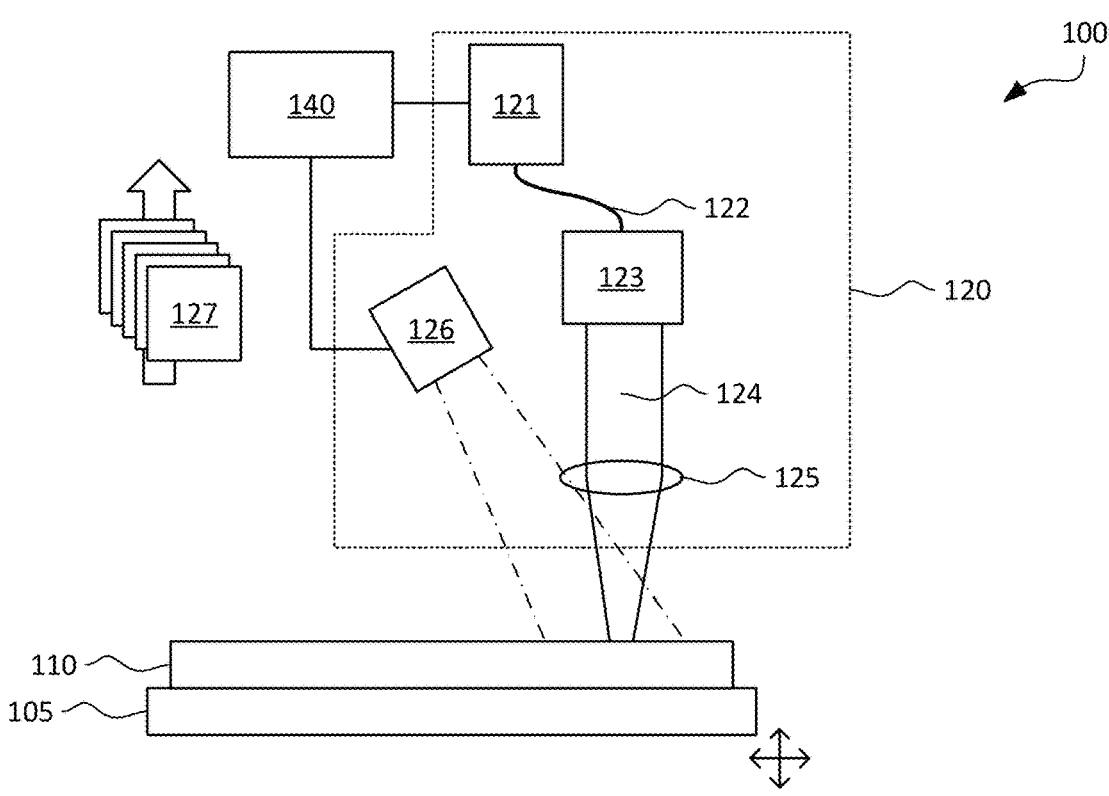
Figure 3B:
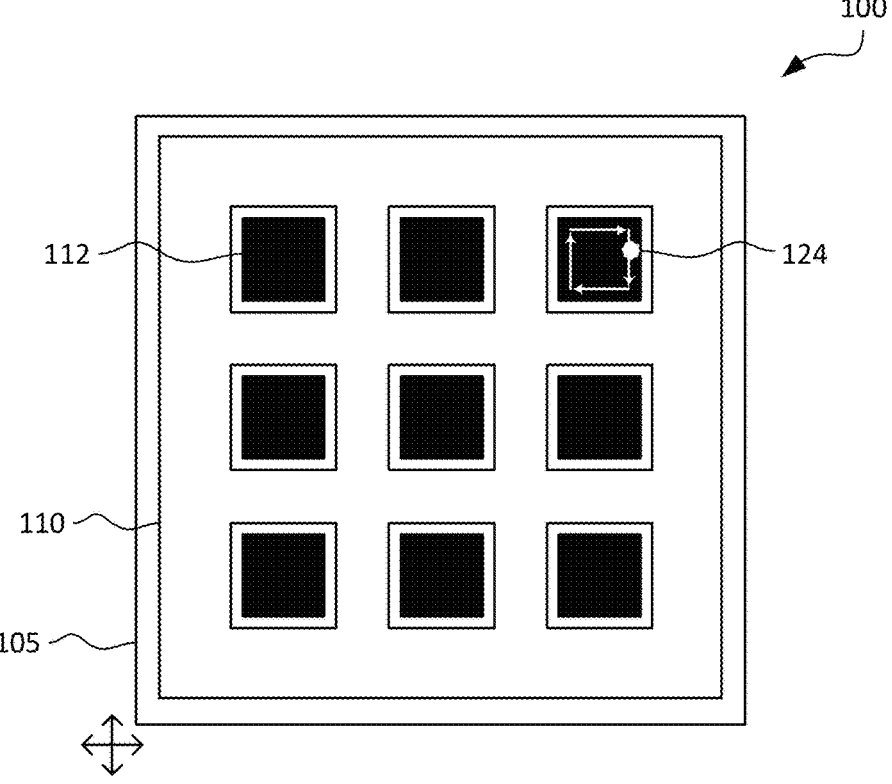
Figure 4:
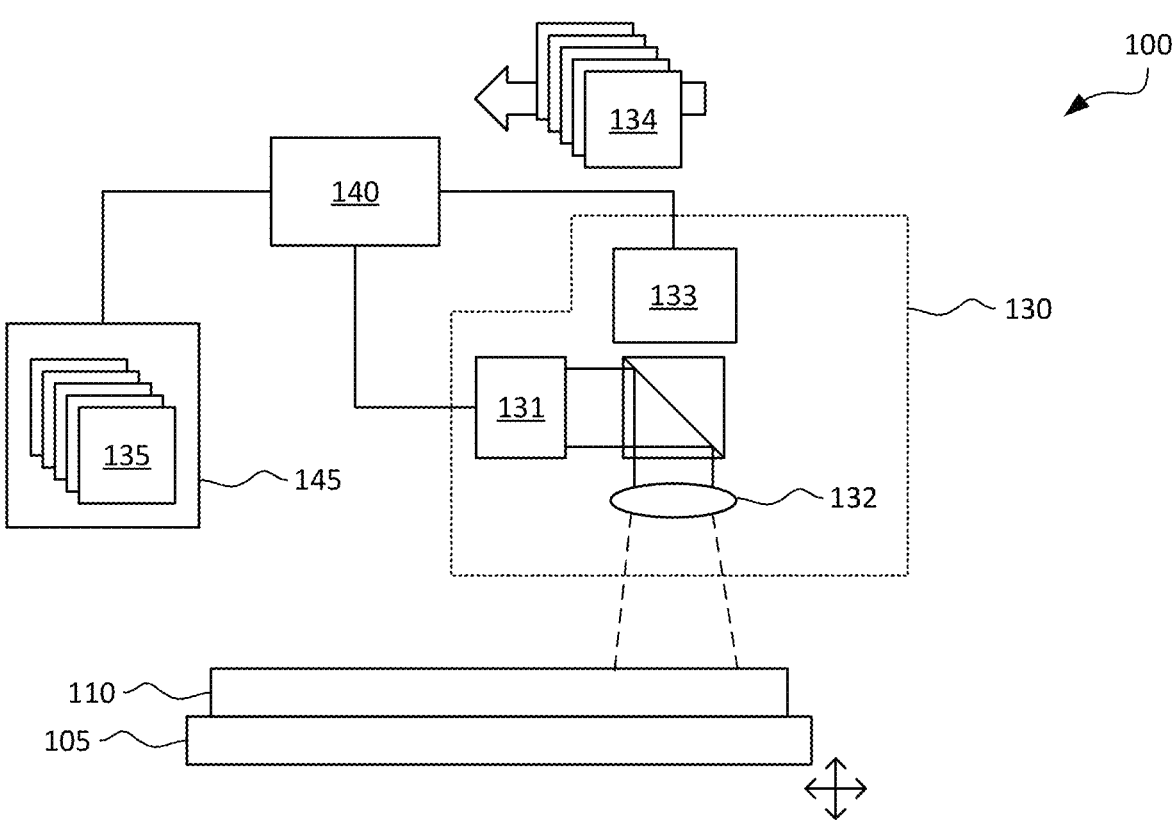
Figure 5:
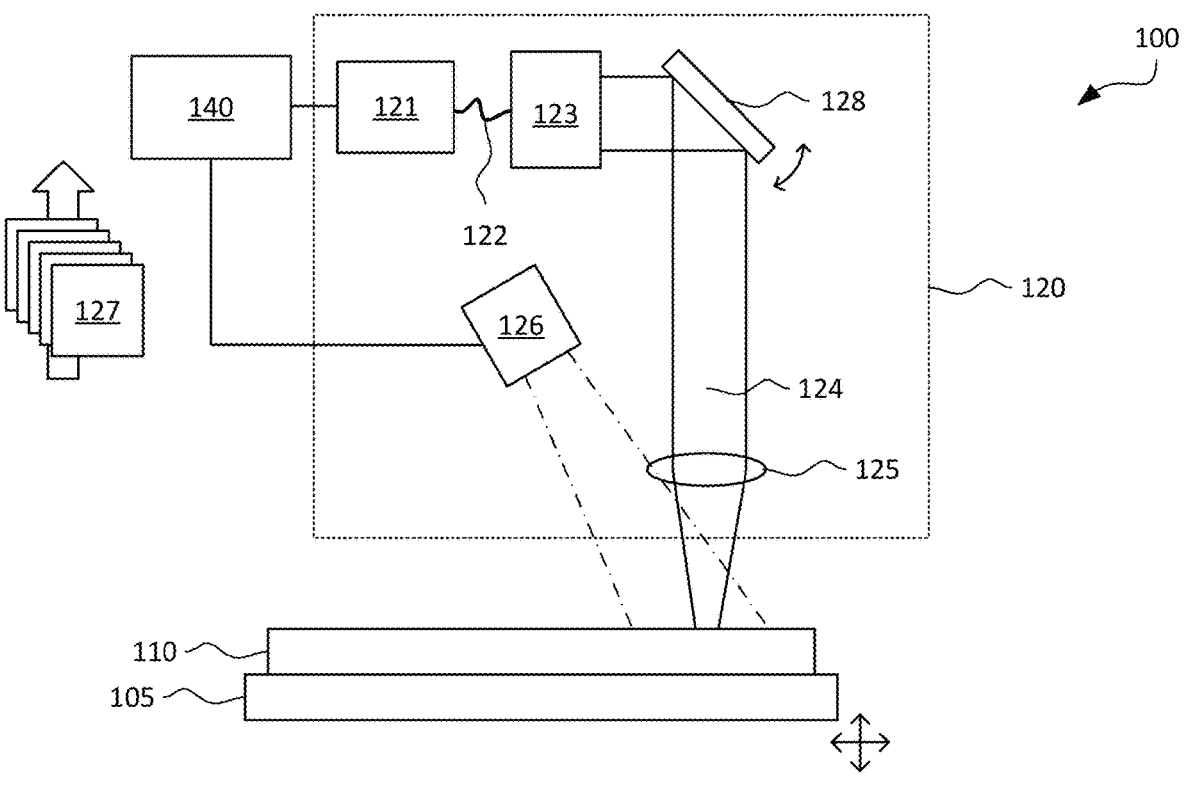
Figure 6A:
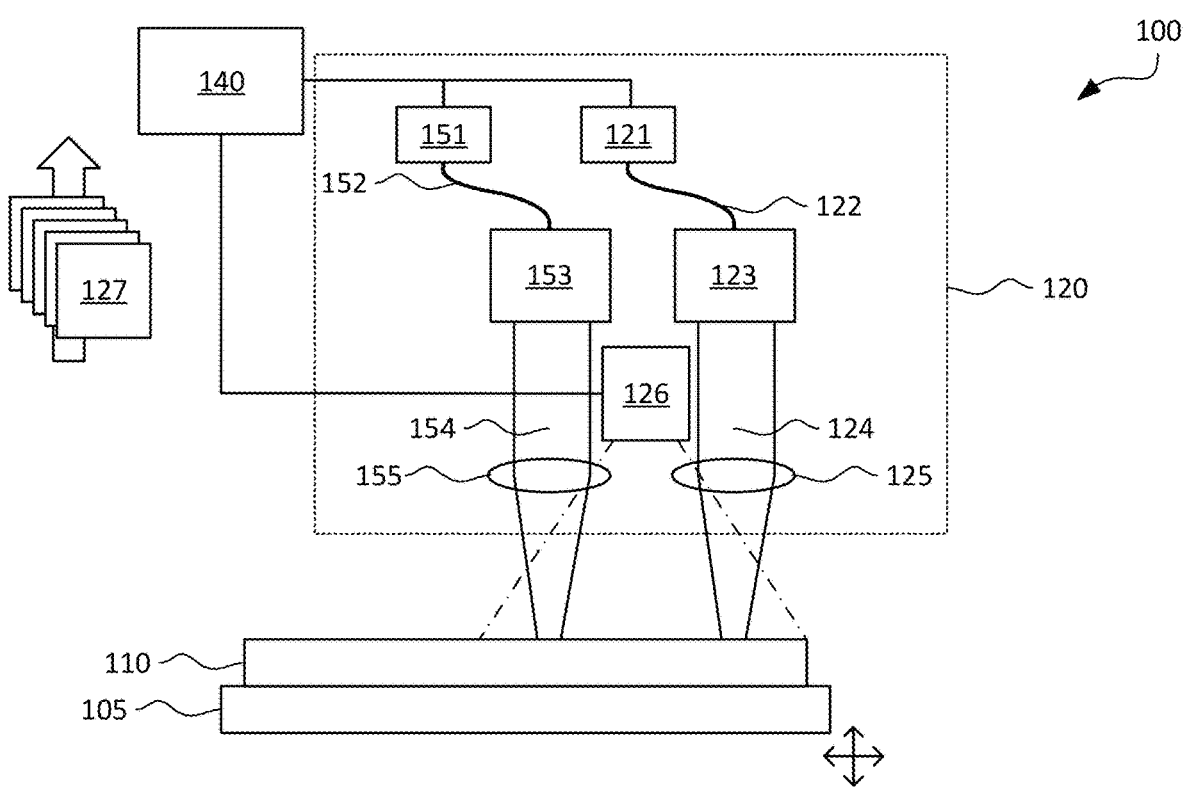
Figure 6B:
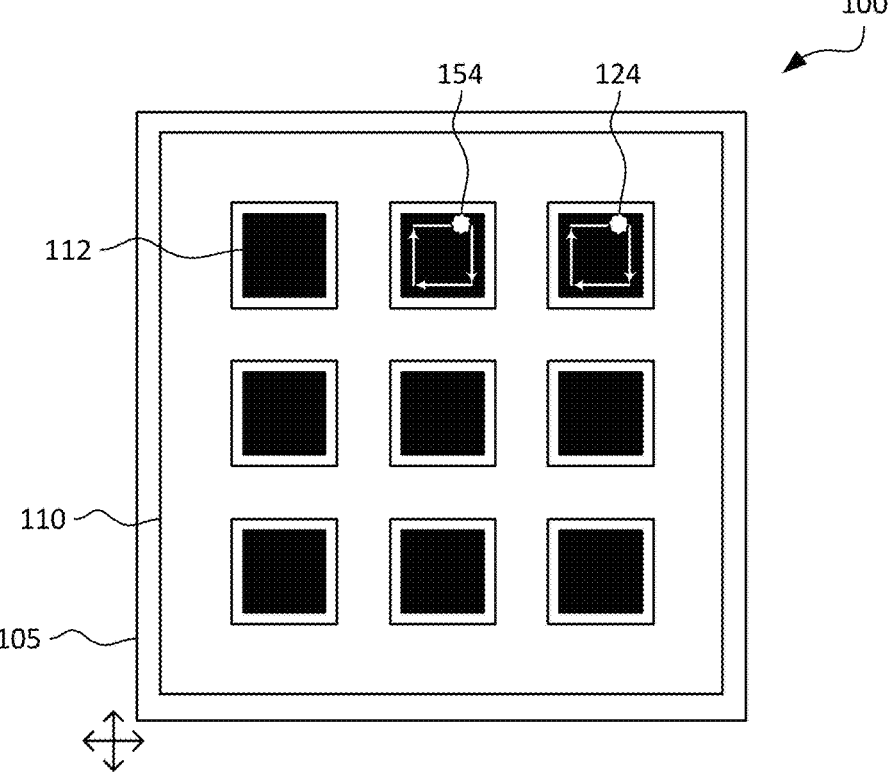
Figure 7:
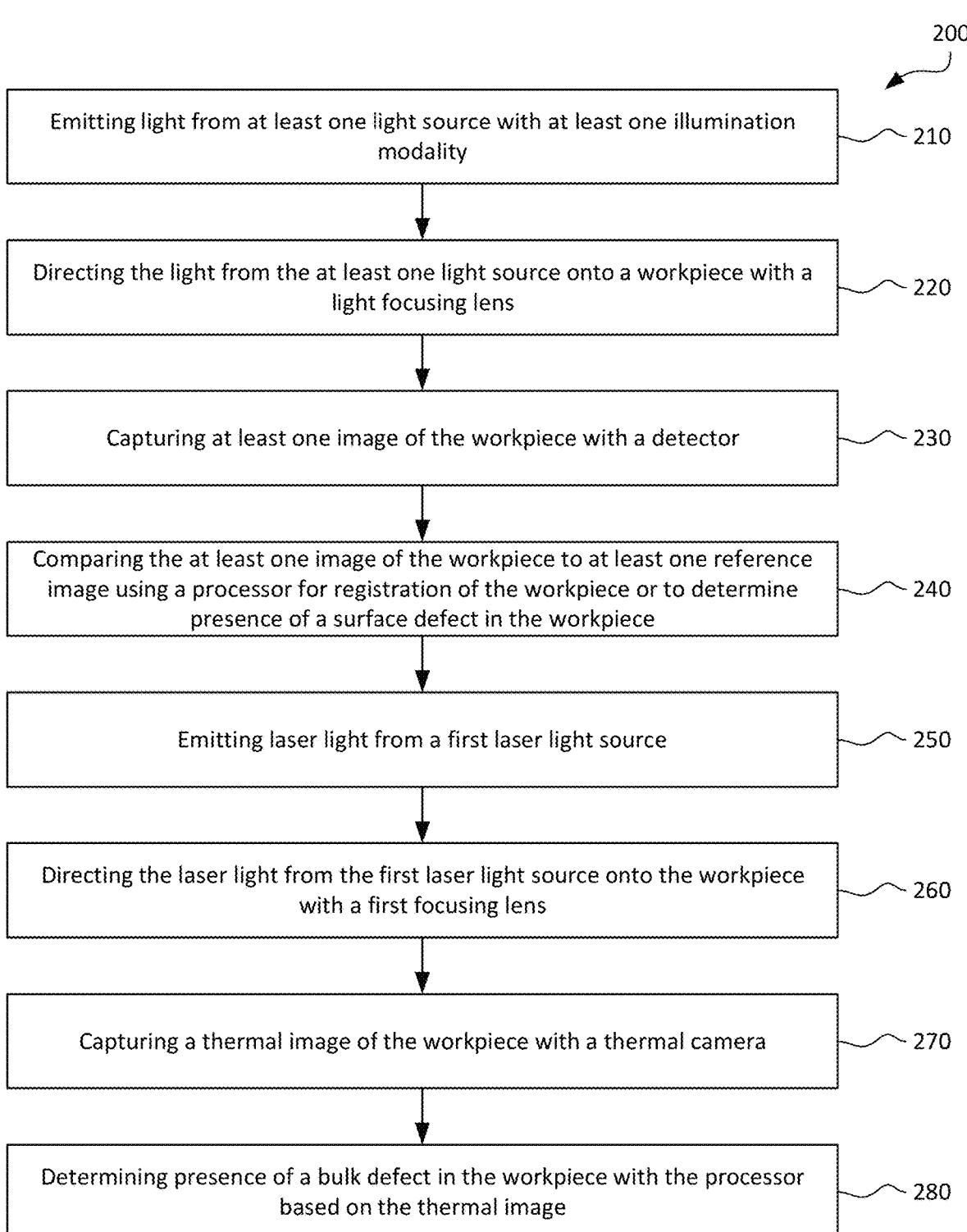
Figure 10:
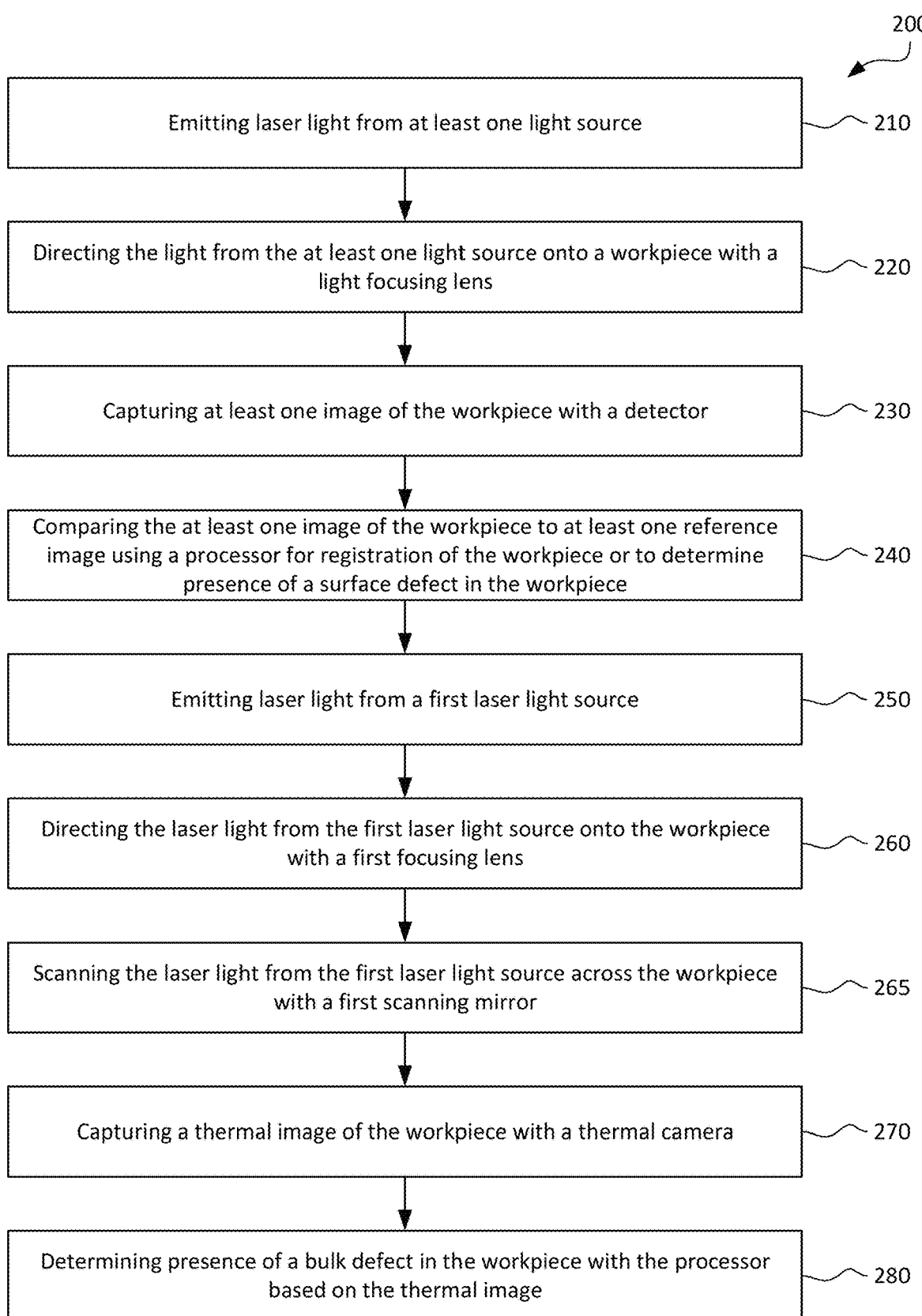
Figure 11:
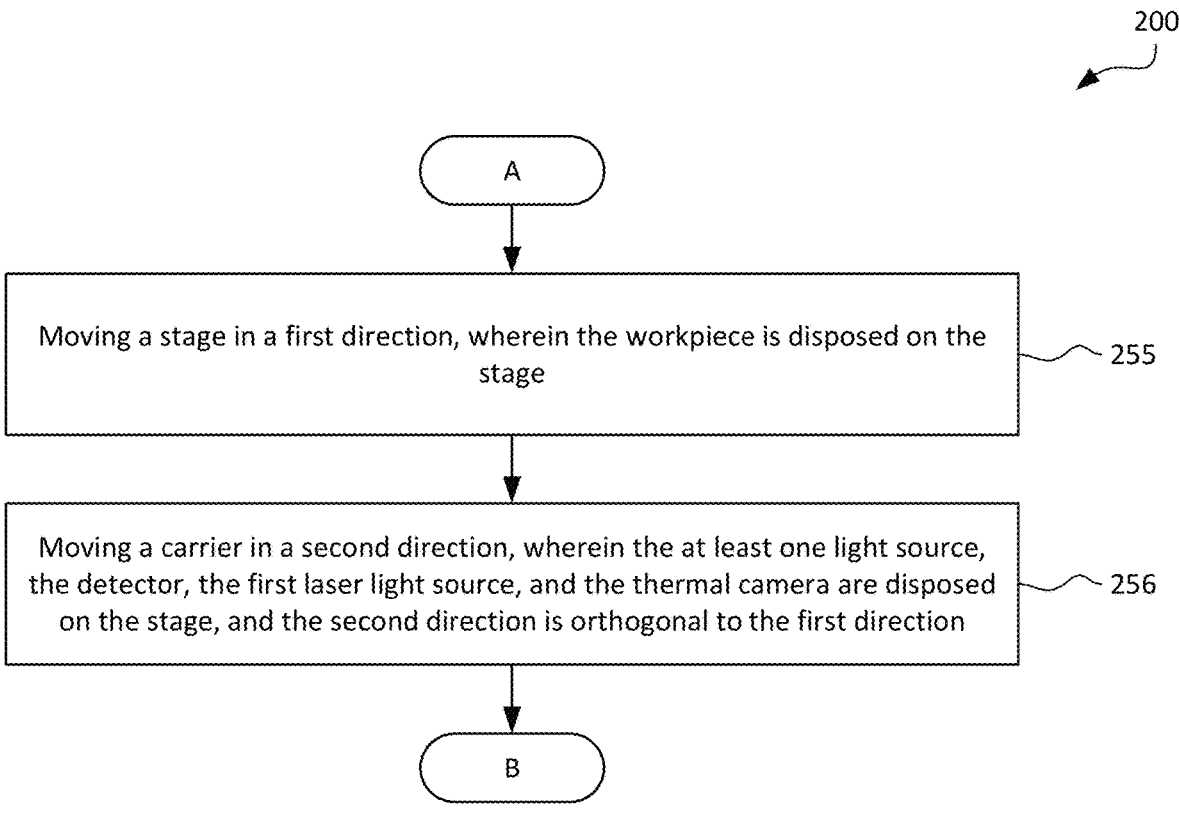

FIB. 2B is a cross-sectional view of an exemplary workpiece of another embodiment of the present disclosure;

FIG. 3A is a side view of a thermal subsystem of the system according to an embodiment of the present disclosure;

FIG. 3B is a top view of the system of FIG. 3A;

FIG. 4 is a side view of an optical subsystem of the system according to an embodiment of the present disclosure;

FIG. 5 is a side view of a thermal subsystem of the system according to another embodiment of the present disclosure;

FIG. 6A is a side view of a thermal subsystem of the system according to another embodiment of the present disclosure;

FIG. 6B is a top view of the system of FIG. 6A;

FIG. 7 is a flowchart of a method according to an embodiment of the present disclosure;

FIG. 8 is a flowchart of a method according to another embodiment of the present disclosure;

FIG. 9 is a flowchart of a method according to another embodiment of the present disclosure;

FIG. 10 is a flowchart of a method according to another embodiment of the present disclosure;

FIG. 11 is a flowchart of a method according to another embodiment of the present disclosure; and FIG. 12 is a flowchart of a method according to another embodiment of the present disclosure.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

An embodiment of the present disclosure provides a system 100, as shown in FIG. 1. The system 100 may be an inspection system or a metrology system for processing or sorting a workpiece 110. The workpiece 110 may be a semiconductor wafer, die, substrate, IC, PCB, flat panel display (FPD), one or more layers of a solid-state battery, or other types of devices. For example, the workpiece 110 may comprise a PCB panel 111 with at least one embedded semiconductor die 112 disposed on the PCB panel 111, as shown in FIG. 2A. Each embedded semiconductor die 112 may be disposed between openings in a substrate layer 113. In some embodiments, a dielectric overcoat layer 114 may be deposited over each embedded semiconductor die 112 and the substrate layer 113, as shown in FIG. 2B. The dielectric overcoat layer 114 may be a translucent ABF coating. The workpiece 110 may be disposed on a stage 105. The stage 105 may be configured to translate (i.e., move in the X, Y, and/or Z directions) and/or rotate (e.g., along the Z axis) to change the orientation of the workpiece 110 relative to other elements of the system 100.

The system 100 may comprise a thermal subsystem 120, an optical subsystem 130, and a processor 140 in electronic communication with the thermal subsystem 120 and the optical subsystem 130. The thermal subsystem 120 and the optical subsystem 130 may be disposed on a carrier 115. The carrier 115 may be movable relative to the stage 105 (e.g., via a bridge 116) to translate (i.e., move in the X, Y, and/or Z directions) the thermal subsystem 120 and the optical subsystem 130 relative to the workpiece 110. In some embodiments, the stage 105 may be configured to move in a first direction (e.g., the X direction), and the carrier 115 may be configured to move in a second direction that is orthogonal to the second direction (e.g., the Y direction). Accordingly, based on corresponding movements of the stage 105 and the carrier 115, the thermal subsystem 120, the optical subsystem 130, and the workpiece 110 can be moved relative to one another to adjust which portion of the workpiece 110 or which embedded semiconductor die 112 is being processed by the system 100 and/or to scan the thermal subsystem 120 and the optical subsystem 130 relative to the workpiece 110. As further described below, the elements of the thermal subsystem 120, the optical subsystem 130, and the processor 140 may be configured to identify defects present in the workpiece 110.

Referring to FIG. 3A, the thermal subsystem 120 may comprise a first laser light source 121. The first laser light source 121 may be a laser diode or other laser light source configured to emit laser light. The laser light may be a pulsed laser or a continuous laser beam. The first laser light source 121 may be coupled to a first optical fiber 122. The first optical fiber 122 may guide the laser light emitted by the first laser light source 121 to a first collimator 123 to produce a first laser beam 124.

The thermal subsystem 120 may further comprise a first focusing lens 125. In some embodiments, the first focusing lens 125 may be an f-theta lens or other type of lens. The first focusing lens 125 may be configured to direct the first laser beam 124 onto the workpiece 110. For example, the first focusing lens 125 may direct the first laser beam 124 onto one of the embedded semiconductor dies 112 of the workpiece 110, as shown in FIG. 3B. The first focusing lens 125 may direct a laser spot from the first laser beam 124 onto the workpiece 110. In some embodiments, the laser spot may be extended in one dimension to form a laser line. In some embodiments, the diameter of the laser spot may be less than 1 mm. The laser spot may impinge the one of the embedded semiconductor dies 112 near its perimeter or edges. By directing the first laser beam 124 onto the workpiece 110, heat may be generated in a non-uniform temperature profile from the laser spot into the workpiece 110.

The thermal subsystem 120 may further comprise a thermal camera 126. The thermal camera 126 may be a forward looking infrared (FLIR) camera or other type of camera. In some embodiments, the thermal camera 126 may be a line sensor or several point sensors instead of an area sensor. The thermal camera 126 may be directed toward the workpiece 110. For example, the field of view of the thermal camera 126 may encompass at least one of the embedded semiconductor dies 112 of the workpiece 110, including the embedded semiconductor die 112 that is impinged with the first laser beam 124. The thermal camera 126 may be configured to capture a thermal image 127 of the workpiece 110. In particular, the heat generated by the laser spot from the first laser beam 124 on the workpiece 110 may have a non-uniform temperature profile near the edges of the embedded semiconductor die 112, and the thermal image 127 may reflect the non-uniform temperature profile (e.g., highest temperature at the position of the laser spot and the temperature being reduced farther away from the spot, both along and away from the edge).

In some embodiments, the thermal subsystem 120 may measure temperature dependent properties (e.g., temperature dependent reflectivity) to generate the thermal image 127 instead of measuring temperature directly.

Referring to FIG. 4, the optical subsystem 130 may comprise at least one light source 131 configured to emit light. The at least one light source 131 may be configured to emit light according to one or more illumination modality, and/or the at least one light source 131 may comprise a plurality of light sources each configured to emit light according to different illumination modality. For example, the at least one illumination modality may be a bright-field configuration, a dark-field configuration, or other configuration, of at least one wavelength or wavelength band of light. Illumination wavebands may range from ultraviolet (UV) light (e.g., about 250 nm) through visible light (e.g., about 400 nm to about 700 nm) and up to infrared (IR) light (e.g., about 1000 nm). Bright-field illumination and dark-field-illumination may utilize light in the same waveband or different wavebands. Multi-wavelength illumination may include using different wavebands (e.g., a combination any combination of UV, blue, green, red, near-IR, etc.). The optical subsystem 130 may be configured to switch between the various light sources 131 of the plurality of light sources or switch illumination modalities of a single light source 131 in order to use the different illumination modalities.

The optical subsystem 130 may further comprise a light focusing lens 132 configured to direct the light from the at least one light source 131 onto the workpiece 110. In some embodiments, the light focusing lens 132 may be an imaging lens, an objective lens, or other type of lens. The light focusing lens 132 may direct the light from the at least one light source 131 onto a portion of the workpiece 110. For example, the portion of the workpiece 110 may include at least one of the embedded semiconductor dies 112. The light from the at least one light source 131 may illuminate workpiece 110 and the embedded semiconductor dies 112 according to the corresponding illumination modality.

The optical subsystem 130 may further comprise a detector 133. The detector 133 may be an area sensor (i.e., camera), a line sensor, a TDI sensor, or other type of detector 133. The detector 133 may be directed toward the workpiece 110. For example, the field of view of the detector 133 may encompass at least one of the embedded semiconductor dies 112 being illuminated by light from the at least one light source 131. The detector 133 may be configured to capture at least one image 134 of the workpiece 110. For example, based on the illumination modality of the at least one light source 131, the detector 133 may capture at least one image 134 of the workpiece 110 based on light reflected/absorbed by the workpiece 110. The at least one image 134 of the workpiece 110 may include a bright-field image, a dark-field image, and images at various wavelengths.

The processor 140 may include a microprocessor, a microcontroller, or other devices. The processor 140 may be coupled to the components of the system 100 in any suitable manner (e.g., via one or more transmission media, which may include wired and/or wireless transmission media) such that the processor 140 can receive output. The processor 140 may be configured to perform a number of functions using the output. An inspection tool can receive instructions or other information from the processor 140. The processor 140 optionally may be in electronic communication with another inspection tool, a metrology tool, a repair tool, or a review tool (not illustrated) to receive additional information or send instructions.

The processor 140 may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high-speed processing and software, either as a standalone or a networked tool.

The processor 140 may be disposed in or otherwise part of the system 100 or another device. In an example, the processor 140 and may be part of a standalone control unit or in a centralized quality control unit. Multiple processors 140 may be used, defining multiple subsystems of the system 100.

The processor 140 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 140 to implement various methods and functions may be stored in readable storage media, such as a memory.

If the system 100 includes more than one subsystem, then the different processors 140 may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 140 may be configured to perform a number of functions using the output of the system 100 or other output. For instance, the processor 140 may be configured to send the output to an electronic data storage unit or another storage medium. The processor 140 may be further configured as described herein.

The processor 140 may be configured according to any of the embodiments described herein. The processor 140 also may be configured to perform other functions or additional steps using the output of the system 100 or using images or data from other sources.

The processor 140 may be communicatively coupled to any of the various components or sub-systems of system 100 in any manner known in the art. Moreover, the processor 140 may be configured to receive and/or acquire data or information from other systems (e.g., inspection results from an inspection system such as a review tool, a remote database including design data and the like) by a transmission medium that may include wired and/or wireless portions. In this manner, the transmission medium may serve as a data link between the processor 140 and other subsystems of the system 100 or systems external to system 100. Various steps, functions, and/or operations of system 100 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random-access memory, a magnetic or optical disk, a non-volatile memory, a solid-state memory, a magnetic tape, and the like. A carrier medium may include a transmission medium such as a wire, cable, or wireless transmission link. For instance, the various steps described throughout the present disclosure may be carried out by a single processor 140 (or computer subsystem) or, alternatively, multiple processors 140 (or multiple computer subsystems). Moreover, different sub-systems of the system 100 may include one or more computing or logic systems. Therefore, the above description should not be interpreted as a limitation on the present disclosure but merely an illustration.

The processor 140 may be in electronic communication with the first laser light source 121. For example, the processor 140 may be configured to send instructions to the first laser light source 121 to emit laser light, which produces the first laser beam 124 that is directed onto the workpiece 110 by the first focusing lens 125.

The processor 140 may be in electronic communication with the at least one light source 131. For example, the processor 140 may be configured to send instructions to one of the at least one light source 131 to emit light according to the corresponding illumination modality, which is directed onto the workpiece 110 by the light focusing lens 132.

The processor 140 may be in electronic communication with the stage 105. For example, the processor 140 may be configured to send instructions to a motor or actuators of the stage 105 to cause the stage 105 to translate or rotate, which causes the first laser beam 124 to scan across the workpiece 110 and changes which portion of the workpiece 110 is illuminated by the light from the at least one light source 131.

The processor 140 may be in electronic communication with the carrier 115. For example, the processor 140 may be configured to send instructions to a motor or actuators of the carrier 115 to cause the carrier 115 to translate or rotate, which causes the first laser beam 124 to scan across the workpiece 110 and changes which portion of the workpiece 110 is illuminated by the light from the at least one light source 131.

In some embodiments, the stage 105 may be movable in a first direction (e.g., the X direction), and the carrier 115 may be movable in a second direction (e.g., the Y direction) that is orthogonal to the first direction. Accordingly, the processor 140 may be configured to send instructions to the motors or actuators of one or both of the stage 105 and carrier 115 to cause movement of the workpiece 110 relative to the thermal subsystem 120 and the optical subsystem 130.

In some embodiments, the thermal subsystem 120 may further comprise a first scanning mirror 128. The first scanning mirror 128 may be disposed between the first collimator 123 and the first focusing lens 125. The first scanning mirror 128 may be configured to move or rotate to change the direction of the first laser beam 124 passing through the first focusing lens 125. The processor 140 may be configured to send instructions to move the first scanning mirror 128. By moving the first scanning mirror 128, the laser spot from the first laser beam 124 may scan across the workpiece 110 (e.g., along an edge of the embedded semiconductor die 112) or may be moved rapidly between discrete positions on the workpiece 110. In some embodiments, the thermal subsystem 120 may include one or more acousto-optical deflectors (AODs) used in place of, or in combination with, the first scanning mirror 128 to scan the first laser beam 124 across the workpiece 110 or move the first laser beam 124 rapidly between discrete position on the workpiece 110.

The processor 140 may be in electronic communication with the thermal camera 126. For example, the processor 140 may be configured to send instructions to the thermal camera 126 to capture one or more thermal images 127 of the workpiece 110. The processor 140 may be configured to receive the one or more thermal images 127 of the workpiece 110 from the thermal camera 126. The processor 140 may be in electronic communication with the detector 133. For example, the processor 140 may be configured to send instructions to the detector 133 to capture one or more images 134 of the workpiece 110 according to each different illumination modality. The processor 140 may be configured to receive the one or more images 134 of the workpiece 110 from the detector 133.

The processor 140 may be in electronic communication with a memory 145. One or more reference images 135 may be stored in the memory 145, corresponding to each of the different illumination modalities. For example, the processor 140 may be configured to recall at least one reference image 135 corresponding to each image 134 of the workpiece 110 captured by the detector 133. The at least one reference image 135 may include bright-field images, dark-field images, or images at different wavelengths/wavebands. The at least one reference image 135 may be an image of a workpiece similar to that of the workpiece 110 being processed. For example, for a workpiece 110 comprising a PCB panel 111 with at least one embedded semiconductor die 112, the reference image 135 may be an image of a PCB panel with at least one embedded semiconductor die. The workpiece in the at least one reference image 135 may not include any defects. The processor 140 may be configured to compare the at least one image 134 of the workpiece 110 to the at least one reference image 135 for registration of the workpiece 110 or to determine presence of surface defects in the workpiece 110. For example, the processor 140 may compare, pixel-by-pixel, the at least one image 134 of the workpiece 110 to the at least one reference image 135 to identify differences between the at least one image 134 of the workpiece 110 and the at least one reference image 135. The locations of the differences may correspond to surface defects in the workpiece 110. Alternatively, the at least one image 134 may be used solely for the purpose of determining the die positions and registering the workpiece 110 without the purpose of detecting defects. For example, the processor 140 may compare, pixel-by-pixel, the at least one image 134 of the workpiece 110 to the at least one reference image 135 to identify similarities between the at least one image 134 of the workpiece 110 and the at least one reference image 135. The die positions will be identified by the processor 140 to direct the first laser beam 124 to the proper positions using the scanning mirror 128 or the stage 105.

The processor 140 may be configured to determine presence of a bulk defect in the workpiece 110 based on the thermal image 127. The processor 140 may be configured to obtain an intensity of each pixel of the thermal image 127 along each edge of the workpiece 110. The intensity of a pixel may correspond to a temperature of an area of the workpiece 110 based on the heat generated by the laser spot from the first laser beam 124. The processor 140 may be configured to derive a gradient map representing the spatial derivative of the temperature profile along each edge of the workpiece 110 using the intensity of each pixel of the thermal image 127. For example, the intensity of each pixel along the edge of the workpiece 110 may be normalized based on the temperature distribution. A non-defective portion of the workpiece 110 may have a smooth transition in the temperature profile or the gradient map based on proximity to the laser spot from the first laser beam. A defect in the workpiece 110 may have a sharp peak in the gradient map, as a crack or other type of defect will distribute heat differently compared to a non-defective portion of the workpiece 110. For example, the intensity may spike or peak compared to the gradient of adjacent pixels. The processor 140 may be configured to determine that a bulk defect in the workpiece 110 exists where there is a peak in the gradient map. For example, the processor 140 may use an edge detection algorithm or other algorithm to identify peaks in the gradient map. In other words, at the location of the defect determined according to the at least one image 134, the thermal image 127 is used to determine that the defect is has substantial depth with respect to the sample thickness (i.e., a bulk defect). The processor 140 may be configured to determine no bulk defect in the workpiece 110 exists where there is no peak in the gradient map. In other words, while surface defects can be determined according to the at least one image 134 of the workpiece 110, they may not affect the temperature profile, but defects beneath the surface (i.e., bulk defects) may affect the temperature profile. Accordingly, bulk defects and surface defects in the workpiece 110 can be identified using the combination of the at least one image 134 of the workpiece 110 and the thermal image 127.

The system 100 can also be used to detect various types of defects in various types of workpieces. For example, the system 100 can be used for detection of air gaps in wafer-to-wafer and die-to-die bonding, detection of cracks in die molds, detection of open circuits in metal lines of a PCB or FPD, detection of cracks in different layers constituting solid state batteries and ceramic materials, or other application use scenarios and is not limited herein. In an instance, cracks as thin as 100 nm may be detected using a thermal camera 136 having a pixel resolution of 5 to 200 μm.

In some embodiments, the thermal subsystem 120 may further comprise additional laser light sources. For example, the thermal subsystem 120 may further comprise a second laser light source 151, as shown in FIG. 6A. The second laser light source 151 may be configured to emit laser light and may be similar to the first laser light source 121. For example, the second laser light source 151 may be coupled to a second optical fiber 152, which may be configured to guide the laser light from the second laser light source 151 to a second collimator 153 to produce a second laser beam 154. A second focusing lens 155 may be configured to direct the second laser beam 154 onto the workpiece 110 at a position that is offset from the first laser beam 124. For example, the first laser beam 124 may be directed at one end of the embedded semiconductor die 112 and the second laser beam 154 may be directed at a midpoint of the embedded semiconductor die 112. Alternatively, the second laser beam 154 may be directed to a different embedded semiconductor die 112, as shown in FIG. 6B. By moving the stage 105, the carrier 115, and/or the first scanning mirror 128 and a corresponding second scanning mirror, the first laser beam 124 and the second laser beam 154 can be scanned across the embedded semiconductor die 112 of the workpiece 110. By using both the first laser light source 121 and the second laser light source 151, detection efficiency can be improved, as the scanning distance is decreased by the portions of the embedded semiconductor die 112 impinged by laser spots from each laser light source. Additional laser light sources can be used impinge the embedded semiconductor die 112 of the workpiece 110 with additional laser spots, which can further improve detection efficiency. In another embodiment, instead of using separate laser light sources 121 and 151, the light from the first laser light source 121 may be split into the first laser beam 124 and the second laser beam 154 using a free space beam splitter, an optical fiber splitter, a diffractive element, or by other methods.

With the system 100, a multi-modal inspection process uses different illumination modalities to capture at least one image 134 of a workpiece 110 and a laser light source 121 to impinge the workpiece 110 and capture a thermal image 127 of the workpiece 110. Using the information from the at least one image 134 of the workpiece 110 and the thermal image 127, the workpiece 110 can be registered, and the presence of bulk defects or surface defects can be determined. For example, the thermal subsystem 120 may be sensitive to bulk defects (e.g. semiconductor cracks), and the optical subsystem 130 may be sensitive to surface defects (e.g. semiconductor scratches) and dielectric coating defects (e.g. delamination), and the combination of these inspection modes can identify both types of defects, for example, in PCB panel embedded semiconductor dies 112 and in overcoated semiconductor under coatings (e.g., dielectric over coat layer 114, such as, for example, ABF overcoat or the like).

Another embodiment of the present disclosure provides a method 200. As shown in FIG. 7, the method 200 may comprise the following steps.

At step 210, light is emitted from at least one light source with at least one illumination modality. The at least one illumination modality may be a bright-field configuration, dark-field configuration, or other configuration, of at least one wavelength or wavelengths band of light, or other type of modality. The light emitted from the at least one light source may depend on the type of light source being used, and the type of workpiece being processed.

In some embodiments, the at least one light source may comprise a plurality of light sources configured to produce different illumination modalities.

At step 220, the light from the at least one light source is directed onto a workpiece with a light focusing lens. For example, the light focusing lens may direct the light from the at least one light source onto an embedded semiconductor die of the workpiece. The workpiece may be a semiconductor wafer, die, substrate, IC, PCB, flat panel display (FPD), one or more layers of a solid-state battery, or other types of devices. For example, the workpiece may comprise a PCB panel with at least one embedded semiconductor die disposed on the PCB panel. Each embedded semiconductor die may be disposed between openings in a substrate layer. In some embodiments, a dielectric overcoat layer may be deposited over each embedded semiconductor die and the substrate layer. The dielectric overcoat layer may be a translucent ABF coating. The light from the at least one light source may illuminate workpiece and the embedded semiconductor dies according to the corresponding illumination modality.

At step 230, at least one image of the workpiece is captured by a detector. The detector may be configured to capture the at least one image based on the illumination modality of the at least one light source. For example, the detector may be configured to capture a bright-field image, a dark-field image, a particular wavelength/waveband image corresponding to the illumination modality of the at least one light source. The detector may be directed at the workpiece, such that at least one of the embedded semiconductor dies of the workpiece is within the field of view of the detector and the at least one image includes the at least one semiconductor die.

In some embodiments, where the at least one light source comprises a plurality of light sources or illumination modalities, steps 210 to 230 may be repeated for each illumination modality. Accordingly, the detector can capture multiple images of the workpiece corresponding to each type of light source or illumination modality, in which each image can vary in illumination wavelength, illumination angular distribution, or both.

At step 240, a processor compares the at least one image of the workpiece to at least one reference image for registration of the workpiece or to determine presence of a surface defect on the workpiece. The at least one reference image may correspond to the type of illumination modality of the at least one image of the workpiece. For example, the at least one reference image may include bright-field images, dark-field images, or images at different wavelengths/wavebands. The at least one reference image may be an image of a workpiece similar to that of the workpiece being processed. For example, for a workpiece comprising a PCB panel with at least one embedded semiconductor die, the reference image may be an image of a PCB panel with at least one embedded semiconductor die. The processor may compare the at least one image of the workpiece to the at least one reference image for registration of the workpiece or to determine presence of a surface defect on the workpiece. For example, the processor may compare, pixel-by-pixel, the at least one image of the workpiece to the at least one reference image to identify differences between the at least one image of the workpiece and the at least one reference image. The locations of the differences may correspond to surface defects in the workpiece. Alternatively, the at least one image may be used solely for the purpose of determining the die positions and registering the workpiece without the purpose of detecting defects. For example, the processor may compare, pixel-by-pixel, the at least one image of the workpiece to the at least one reference image to identify similarities between the at least one image of the workpiece and the at least one reference image. The die positions will be identified by the processor to direct the first laser beam to the proper positions using the scanning mirror or the stage.

In some embodiments, step 240 may comprise the following steps, as shown in FIG. 8.

At step 241, at least one reference image corresponding to a same illumination modality of the at least one image of the workpiece is obtained from a memory. The memory may be configured to store a plurality of reference images corresponding to different illumination modalities any types of workpieces. Accordingly, the processor may obtain at least one reference image from the memory based on the type of workpiece and illumination modality used to obtain the at least one image of the workpiece.

At step 242, the at least one reference image is compared to the at least one image of the workpiece with the same illumination modality. For example, for at least one image of the workpiece captured using bright-field blue light, a corresponding reference image of a similar workpiece captured using bright-field blue light is used for comparison to the at least one image of the workpiece. In some embodiments where multiple illumination modalities are used to capture images of the workpiece, steps 241 and 242 may be repeated to obtain corresponding reference images for the images of the workpiece at each illumination modality.

At step 243, the workpiece is registered based on similarities between the at least one reference image and the at least one image of the workpiece with the same illumination modality. For example, the processor may compare, pixel-by-pixel, each image of the workpiece to the corresponding reference image with the same illumination modality to identify similarities between each image of the workpiece and the corresponding reference image. Similarities between at least one of the images of the workpiece and the corresponding reference image may be used to identify the locations of embedded dies and other features of the workpiece. Different illumination modalities may be used to different features of different types of workpieces. By using different illumination modalities, the method 200 may be more robust in registering the workpiece.

At step 244, presence of a surface defect on the workpiece is determined based on differences between the at least one reference image and the at least one image of the workpiece with the same illumination modality. For example, the processor may compare, pixel-by-pixel, each image of the workpiece to the corresponding reference image with the same illumination modality to identify differences between each image of the workpiece and the corresponding reference image. A difference between at least one of the images of the workpiece and the corresponding reference image may indicate a defect present in the workpiece. Different illumination modalities may be used to identify different types of defects in different types of workpieces. By using different illumination modalities, the method 200 may be more robust in identifying defects in the workpiece.

At step 250, laser light is emitted from a first laser light source. The first laser light source may be a laser diode or other laser light source configured to emit laser light. The laser light may be a pulsed laser or a continuous laser beam. The first laser light source may be coupled to a first optical fiber. The first optical fiber may guide the laser light emitted by the first laser light source to a first collimator to produce a first laser beam.

At step 260, the laser light from the first laser light source is directed onto the workpiece with a first focusing lens. For example, the first focusing lens may direct a laser spot from the first laser beam onto the workpiece at the location of the defect. The diameter of the laser spot may be less than 1 mm. By directing the first laser beam onto the workpiece, heat may be generated in a non-uniform temperature profile from the laser spot into the workpiece at the location of the defect.

At step 270, a thermal image of the workpiece is captured with a thermal camera. The thermal camera may be a forward looking infrared (FLIR) camera or other type of non-contact temperature measurement sensor or array of sensors. The thermal camera may be directed toward the workpiece at the location of the defect. The heat generated by the laser spot from the first laser beam on the first face may have a non-uniform temperature profile that extends into the workpiece (e.g., with the highest temperature at the edge and the temperature being reduced farther away from the edge).

At step 280, the processor determines presence of a bulk defect in the workpiece based on the thermal image. A bulk defect may correspond to a defect within the embedded semiconductor die, below the surface, while a surface defect may correspond to a defect on the surface of the embedded semiconductor die or in an overcoat layer on top of the embedded semiconductor die. In an instance, cracks of submicron thickness may be detected.

In some embodiments, step 280 may comprise the following steps, as shown in FIG. 9.

At step 281, an intensity is obtained of each pixel of the thermal image along an edge of the workpiece. The intensity of a pixel may correspond to a temperature of an area of the workpiece based on the heat generated by the laser spot from the first laser beam.

At step 282, a gradient map representing the spatial derivative of the temperature profile along each edge of the workpiece is derived using the intensity of each pixel of the thermal image. The intensity of each pixel in the gradient map may be normalized based on the temperature distribution, to account for the distance of each pixel from the laser beam position. A non-defective portion of the workpiece may have a smooth transition in the gradient map based on proximity to the laser spot from the first laser beam. A defect in the workpiece may have a sharp peak in the gradient map, as a crack or other type of defect will distribute heat differently compared to a non-defective portion of the workpiece. For example, the intensity may spike or drop compared to the gradient of adjacent pixels. An edge detection algorithm or other algorithm may be used to identify peaks in the gradient map.

At step 283, a bulk defect in the workpiece is determined to exist where there is a peak in the gradient map. In other words, the thermal image is used to determine that the defect is superficial or of substantial depth (i.e., a bulk defect).

At step 284, no bulk defect in the workpiece is determined to exist where there is no peak in the gradient map. In other words, the thermal image may indicate the temperature profile is not affected and any defect may only be surface level (e.g., as identified according to the at least one image of the workpiece).

The method 200 can be used to detect various types of defects in various types of workpieces. For example, the method 200 can be used for detection of air gaps in wafer-to-wafer and die-to-wafer bonding, detection of cracks in die molds, detection of open circuits in metal lines of a PCB or FPD, detection of cracks in solid state batteries and ceramic materials, or other application use scenarios and is not limited herein.

In some embodiments, the method 200 may further comprise step 265, as shown in FIG. 10. At step 265, the laser light from the first laser light source may be scanned across the workpiece with a first scanning mirror. The first scanning mirror may be disposed between the first collimator and the first focusing lens. The first scanning mirror may be configured to move or rotate to change the direction of the first laser beam passing through the first focusing lens. By moving the first scanning mirror, the laser spot from the first laser beam may scan across the workpiece, for example, along an edge of the embedded semiconductor die. In some embodiments, the first scanning mirror can move to scan the laser spot around the perimeter of the embedded semiconductor die to heat all of the edges.

In some embodiments, the method 200 may further comprise steps 255 and 256, as shown in FIG. 11.

At step 255, a stage is moved in a first direction. The workpiece may be disposed on the stage, and one or more motors or actuators of the stage can cause the stage to translate in the first direction.

At step 256, a carrier is moved relative to the stage in a second direction. The second direction may be orthogonal to the first direction. The at least one light source, the detector, the first laser light source, and the thermal camera may be disposed on the carrier, and one or more motors or actuators of the carrier can cause the carrier to translate in the second direction. In some embodiments, the first direction may be the X direction and the second direction may be the Y direction relative to the workpiece.

Steps 255 and step 256 may be performed at various times in the method 200. With reference to FIG. 11, block A refers to a step of the method 200 performed before step 255 and/or step 256, and block B refers to a step of the method performed after step 255 and/or step 256.

In an example, step 255 and/or step 256 may be performed before step 210. In other words, block A may refer to a start of the method 200, and block B may refer to step 210. Accordingly, the stage and/or the carrier may position the workpiece such that a portion of the workpiece is illuminated by the light from the at least one light source to capture at least one image of the workpiece.

In another example, step 255 and/or step 256 may be performed before step 250. In other words, block A may refer to step 240, and block B may refer to step 250. Accordingly, the stage and/or the carrier may position the workpiece such that the laser spot from the laser light source can impinge on the location of an embedded die of the workpiece or on the location of a surface defect of the workpiece identified according to the at least one image of the workpiece. In another example, step 255 and/or step 256 may be performed before step 270. Accordingly, the stage and/or the carrier can scan the laser spot from the laser light source across the workpiece to heat an edge or around the perimeter of the embedded semiconductor die.

In another example, step 255 and/or step 256 may be performed after step 280. In other words, block A may refer to step 280, and block B may refer to step 210 (e.g., restarting the method 200). Accordingly, after detecting defects in one of the embedded semiconductor dies in a portion of the workpiece, the workpiece can be moved to illuminate a different portion of the workpiece with the light from the at least one light source or to direct the laser spot onto a different embedded semiconductor die for further processing of the workpiece.

In some embodiments, the method 200 may further comprise step 252 and step 262, as shown in FIG. 12.

At step 252, laser light is emitted from a second laser light source. The second laser light source may be configured to emit laser light and may be similar to the first laser light source. For example, the second laser light source may be coupled to a second optical fiber, which may be configured to guide the laser light from the second laser light source to a second collimator to produce a second laser beam. Alternatively, the second laser beam may be produced by splitting the first laser beam using a free space beam splitter or other optical elements.

At step 262, the laser light from the second laser light source is directed onto the workpiece with a second focusing lens at a position that is offset from the laser light from the first laser light source. For example, the first laser beam may be directed at one end of the workpiece and the second laser beam may be directed at a midpoint of the workpiece.

Steps 250 and 252 can be performed simultaneously or at different times and is not limited herein. By moving the stage, the carrier, or the first scanning mirror and a corresponding second scanning mirror, the first laser beam and the second laser beam can be scanned across the workpiece.

By using both the first laser light source and the second laser light source, detection efficiency can be improved, as the scanning distance is decreased by the portions of the workpiece impinged by laser spots from each laser light source. Additional laser light sources can be used impinge the workpiece with additional laser spots, which can further improve detection efficiency.

In some embodiments, optical inspection of the workpiece in steps 210 to 240 may be performed before thermal inspection of the workpiece in steps 250 to 280. Since optical inspection can scan the workpiece much faster than thermal inspection, performing the optical inspection steps first can help reduce the thermal inspection time by focusing on suspicious dies (rather than scanning the entire workpiece).

In some embodiments, thermal inspection of the workpiece in steps 250 to 280 may be performed before optical inspection of the workpiece in steps 210 to 240. For a detector having a high resolution and small FOV, performing the optical inspection steps after the thermal inspection steps can allow the dies to be reviewed and/or classified by high-resolution imaging after defects are detected by thermal inspection.

In some embodiments, optical inspection of the workpiece in steps 210 to 240 may be performed in parallel to thermal inspection of the workpiece in steps 250 to 280. Alternatively, optical inspection of the workpiece in steps 210 to 240 may be performed selectively or interchangeably from thermal inspection of the workpiece in steps 250 to 280. Since optical inspection and thermal inspection may be sensitive to different types of defects in the workpiece, each type of inspection can be performed depending on the particular workpiece. For example, for a workpiece comprising an embedded die with ABF coating, the optical inspection of the workpiece can detect cracks in the ABF coating, and the thermal inspection of the workpiece can detect cracks in the die.

With the method 200, a multi-modal inspection process uses different illumination modalities to capture at least one image of a workpiece and a laser light source to impinge the workpiece and capture a thermal image of the workpiece. Using the information from the at least one image of the workpiece and the thermal image, the workpiece can be registered, and the presence of bulk defects or surface defects can be determined. For example, the thermal module may be sensitive to bulk defects (e.g. semiconductor cracks), and the optical module may be sensitive to surface defects (e.g. semiconductor scratches) and dielectric coating defects (e.g. delamination), and the combination of these inspection modes can identify both types of defects, for example, in PCB panel embedded semiconductor dies and in overcoated semiconductor under coatings (e.g. ABF overcoat).

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
   a thermal subsystem comprising:
   a first laser light source configured to emit laser light;
   a first focusing lens configured to direct the laser light from the first laser light source onto a workpiece; and
   a thermal camera configured to capture a thermal image of the workpiece;

an optical subsystem comprising:

at least one light source configured to emit light with at least one illumination modality;

a light focusing lens configured to direct the light from the at least one light source onto the workpiece; and a detector configured to capture at least one image of the workpiece; and a processor in electronic communication with the thermal subsystem and the optical subsystem, wherein the processor is configured to:

compare the at least one image received from the detector to at least one reference image to for registration of the workpiece or to determine presence of a surface defect on the workpiece; and determine presence of a bulk defect in the workpiece based on the thermal image, wherein the processor is configured to determine the presence of the bulk defect in the workpiece based on the thermal image by:

obtaining an intensity of each pixel of the thermal image along an edge of the workpiece;

deriving a gradient map representing a spatial derivative of a temperature profile along the edge of the workpiece using the intensity of each pixel of the thermal image;

determining that the bulk defect in the workpiece exists where there is a peak in the gradient map; and determining that no bulk defect exists in the workpiece where there is no peak in the gradient map.

2. The system of claim 1, wherein the workpiece is a PCB panel with at least one embedded semiconductor die.

3. The system of claim 2, wherein the PCB panel further includes a dielectric overcoat layer deposited over the at least one embedded semiconductor die.

4. The system of claim 1, further comprising:

a first scanning mirror configured to direct the laser light from the first laser light source to scan around a perimeter of the workpiece.

5. The system of claim 1, further comprising:

a stage, wherein the workpiece is disposed on the stage and the stage is movable relative to the thermal subsystem in a first direction; and a carrier, wherein the thermal subsystem and the optical subsystem are disposed on the carrier and the carrier is movable relative to the stage in a second direction that is orthogonal to the first direction.

6. The system of claim 1, wherein the thermal subsystem further comprises:

a second laser light source configured to emit laser light; and a second focusing lens configured to direct the laser light from the second laser light source onto the workpiece at a position that is offset from the laser light from the first laser light source.

7. The system of claim 1, wherein the thermal camera is a forward looking infrared (FLIR) camera.

8. The system of claim 1, wherein the at least one illumination modality comprises a plurality of illumination modalities, wherein the at least one light source is configured to emit light according to each of the plurality of illumination modalities.

9. The system of claim 8, wherein the detector is configured to capture a plurality of images of the workpiece corresponding to the plurality of illumination modalities.

10. The system of claim 1, wherein the processor is configured to register the workpiece based on similarities between the at least one reference image and the at least one image of the workpiece with a same illumination modality.

11. The system of claim 1, wherein the processor is configured to determine presence of a surface defect in the workpiece based on differences between at the at least one reference image and the at least one image of the workpiece with a same illumination modality.

12. A method comprising:

emitting light from at least one light source with at least one illumination modality;

directing the light from the at least one light source onto a workpiece with a light focusing lens;

capturing at least one image of the workpiece with a detector;

comparing, with a processor, the at least one image of the workpiece to at least one reference image for registration of the workpiece or to determine presence of a surface defect on the workpiece;

emitting laser light from a first laser light source;

directing the laser light from the first laser light source onto the workpiece with a first focusing lens;

capturing a thermal image of the workpiece with a thermal camera; and determining, with the processor, presence of a bulk defect in the workpiece based on the thermal image by;

obtaining an intensity of each pixel of the thermal image along an edge of the workpiece;

deriving a gradient map representing a spatial derivative of a temperature profile along the edge of the workpiece based on the intensity of each pixel of the thermal image;

determining that the bulk defect in the workpiece exists where there is a peak in the gradient map; and determining that no bulk defect exists in the workpiece where there is no peak in the gradient map.

13. The method of claim 12, wherein the workpiece is a PCB panel with at least one embedded semiconductor die.

14. The method of claim 12, further comprising:

scanning the laser light from the first laser light source around a perimeter of the workpiece with a first scanning mirror.

15. The method of claim 12, further comprising:

moving a stage in a first direction, wherein the workpiece is disposed on the stage; and moving a carrier relative to the stage in a second direction, wherein the second direction is orthogonal to the first direction and the at least one light source, the detector, the first laser light source, and the thermal camera are disposed on the carrier.

16. The method of claim 12, further comprising:

emitting laser light from a second laser light source; and directing the laser light from the second laser light source onto the workpiece with a second focusing lens at a position that is offset from the laser light from the first laser light source.

17. The method of claim 12, wherein comparing, with the processor, the at least one image of the workpiece to at least one reference image for registration of the workpiece or to determine presence of a surface defect in the workpiece comprises:

obtaining, from a memory, at least one reference image corresponding to a same illumination modality of the at least one image of the workpiece;

comparing the at least one reference image to the at least one image of the workpiece with the same illumination modality; and registering the workpiece based on similarities between the at least one reference image and the at least one image of the workpiece with the same illumination modality.

18. The method of claim 17, wherein comparing, with the processor, the at least one image of the workpiece to at least one reference image for registration of the workpiece or to determine presence of a surface defect on the workpiece further comprises:

determining presence of a surface defect on the workpiece based on differences between the at least one reference image and the at least one image of the workpiece with the same illumination modality.

* * * * *